May 14, 1957 J. A. FETCHKO 2,792,130
CARGO HANDLING DEVICE
Filed June 18, 1952 4 Sheets-Sheet 1

INVENTOR.
JOSEPH A. FETCHKO
BY Edward Halle
ATTORNEY

May 14, 1957 J. A. FETCHKO 2,792,130
CARGO HANDLING DEVICE
Filed June 18, 1952 4 Sheets-Sheet 2

INVENTOR.
JOSEPH A. FETCHKO
BY Edward Hall
ATTORNEY

May 14, 1957　　　J. A. FETCHKO　　　2,792,130
CARGO HANDLING DEVICE
Filed June 18, 1952　　　　　　　　　　　4 Sheets-Sheet 3
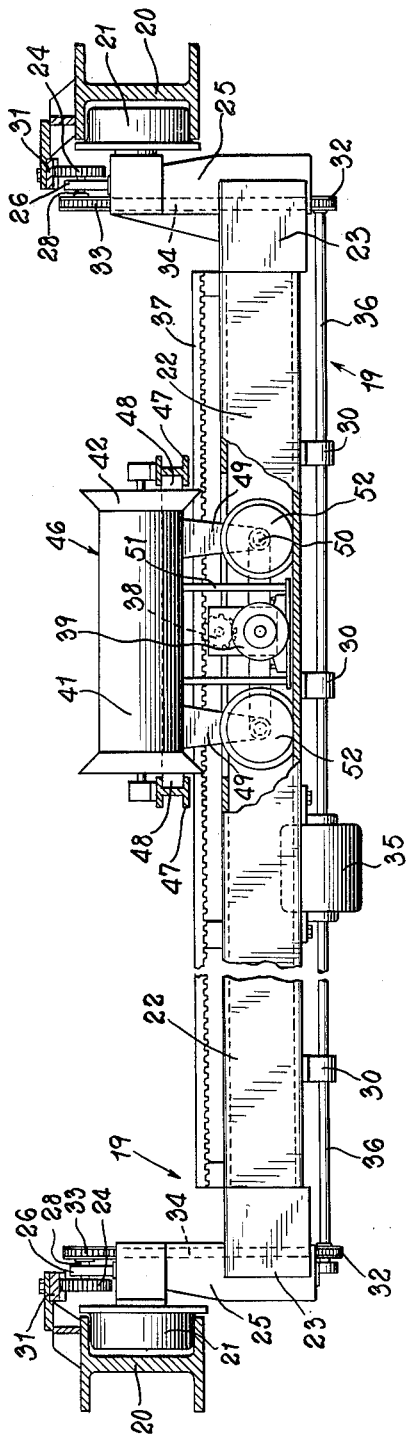
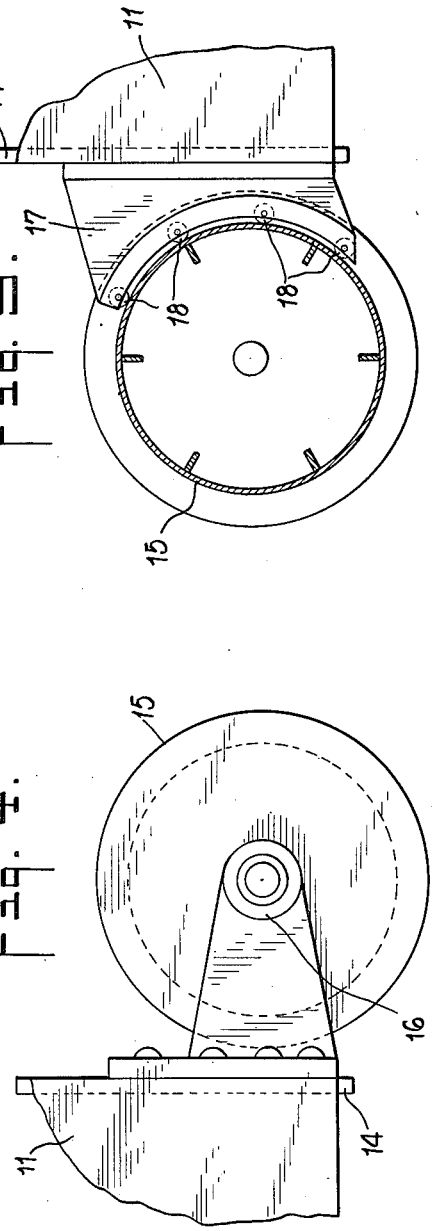
INVENTOR.
JOSEPH A. FETCHKO
BY Edward Halle
ATTORNEY May 14, 1957  J. A. FETCHKO  2,792,130
CARGO HANDLING DEVICE
Filed June 18, 1952  4 Sheets-Sheet 4
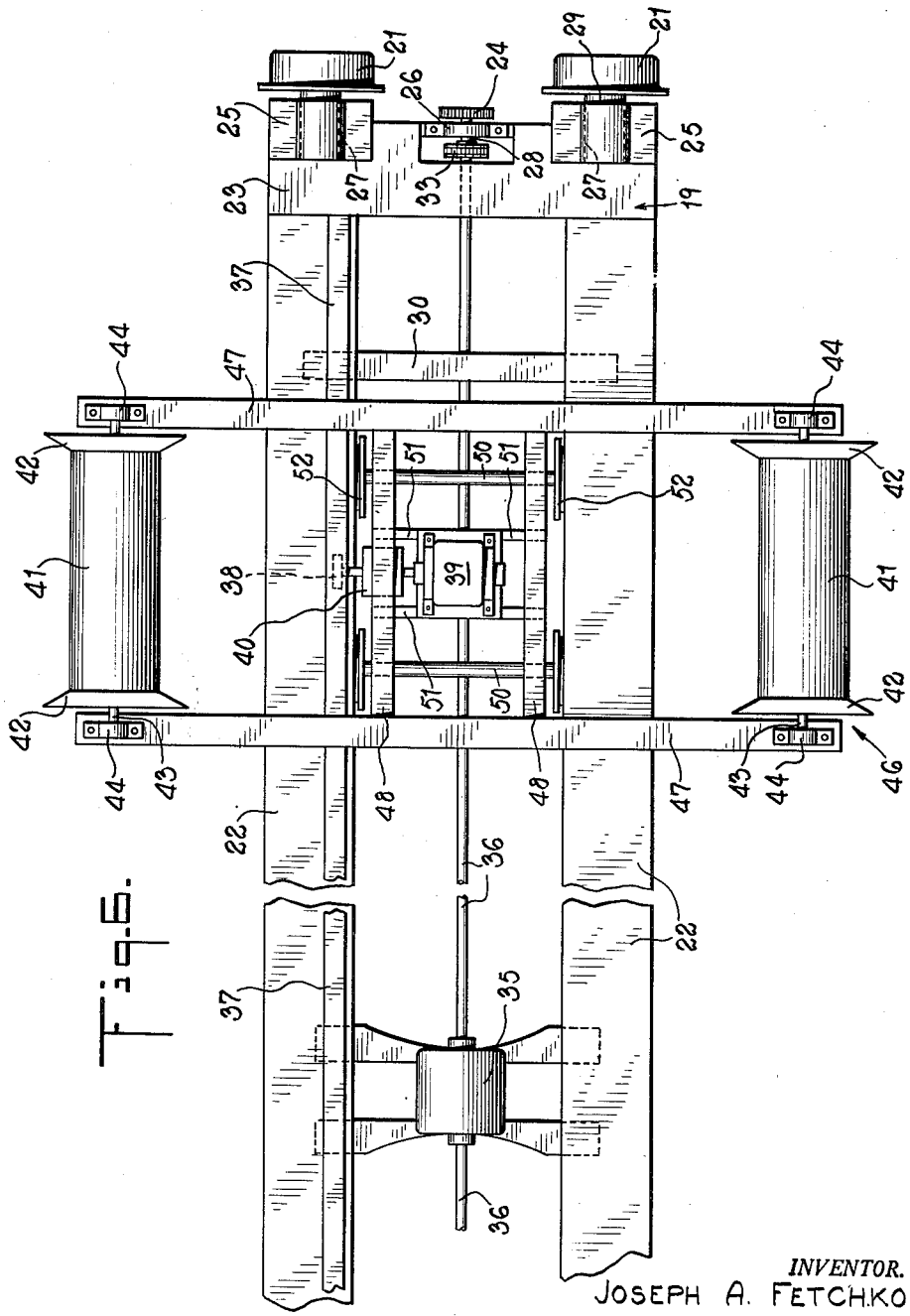
INVENTOR.
JOSEPH A. FETCHKO
BY Edward Halle
ATTORNEY

United States Patent Office 2,792,130
Patented May 14, 1957

2,792,130

CARGO HANDLING DEVICE

Joseph A. Fetchko, Bayonne, N. J.

Application June 18, 1952, Serial No. 294,208

4 Claims. (Cl. 214—15)

My invention relates to a new type of cargo loading and discharging device.

It is well known that the greatest expense in the operation of a merchant vessel is the cost of handling and managing the cargo carried in the ship's holds. The cost of readying, loading, and discharging sometimes equals half of the freight rate earned by the vessel.

One of the most serious problems encountered in loading and discharging cargo is that a given portion of the cargo may not be lowered directly to any portion of the hold. It must first be lowered to the floor of the hold, within the hatchway area, when it is then moved into the wings (sides) or ends of the hold, by means of jacking, sliding on rollers, being physically carried, or rolled end on end by cargo handlers. This method is costly, time consuming and subjects the crates and their contents to damage.

Only one deck may be loaded through a hatch at any one time and full advantage of available line speeds of modern cargo handling gear may not be utilized. As a result, in addition to the costly operation described, the vessel is held up in port for long periods of time for loading and discharging with consequent loss of revenue.

It is therefore an object of my invention to provide a device of simple construction to accomplish direct loading and discharge of cargo to and from those portions in a ship's hold which are not directly beneath the square, or opening, of the ship's hatch.

Another object of my invention is to provide such a device to eliminate delays in the transfer of cargo.

Another object of my invention is to provide a device to enable loading and discharge of cargo through one hatch, simultaneously to more than one deck.

Another object of my invention is to provide a cargo loading and unloading device by which cargo may be placed in and removed from any portion abreast of the hatchway without shifting cargo in the hold.

Other objects and advantages will be apparent from the following description when read in connection with the accompanying drawings in which:

Fig. 3 shows the main carrying frame of my device with a break to the left of center and a portion of the right side cut away to show details of installation of the secondary carrying frame of my device;

Fig. 4 is an end view of a longitudinal roller and end bearing therefor comprising a part of my device;

Fig. 5 is a sectional view along the lines 5—5 in Fig. 2 showing a cross-section of the longitudinal roller and details of an intermediate bearing therefor; and Fig. 6 is a top view of the main carrying frame showing the secondary carrying frame supported therein.

Similar numerals refer to similar parts throughout the several views.

Figure 1:
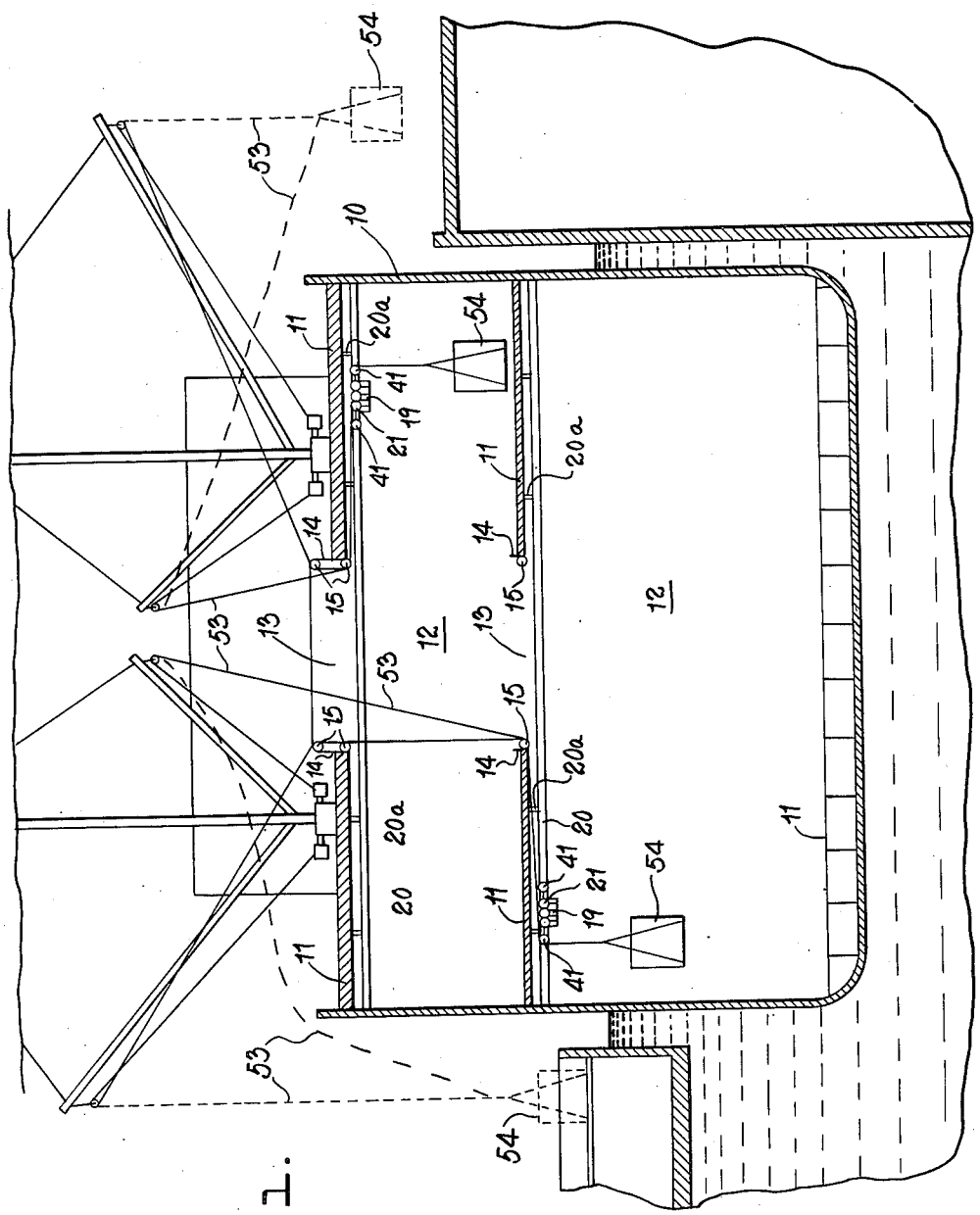
Fig. 1 shows a cross-section of the hull of a ship with my device installed.

Referring more particularly to the drawings, the numeral 10 designates the hull of a ship which acts as the main frame for my device having decks 11 and hatchways 12, communicating with the decks 11. The hatch openings 13, at the various deck levels have hatchway coamings 14. Each hatch opening 13, has on each side, for its full length fore and aft, adjacent, to the hatchway coaming 14, a longitudinal roller 15. The longitudinal roller 15 is supported by bearings 16 at each of its ends. Further support is given by secondary roller supports 17, having suitable roller bearings 18, in contact with the periphery of the cylinder of the longitudinal roller 15. The longitudinal roller 15 is positioned so that the portion of its periphery facing the center of the vessel is more toward center of the vessel than the inner surface of the hatchway coaming 14, and the lower portion of the periphery thereof is slightly lower than the underside of the hatchway coaming 14, adjacent thereto.

The invention also includes two movable carrying frames. The primary carrying frame 19 is made of steel or equivalent material and moves from port to starboard of the vessel and is supported by parallel overhead track beams 20. Flanged wheels 21, at each end of the primary carrying frame 19 support and guide it along and between the parallel overhead track beams 20.

Figure 2:
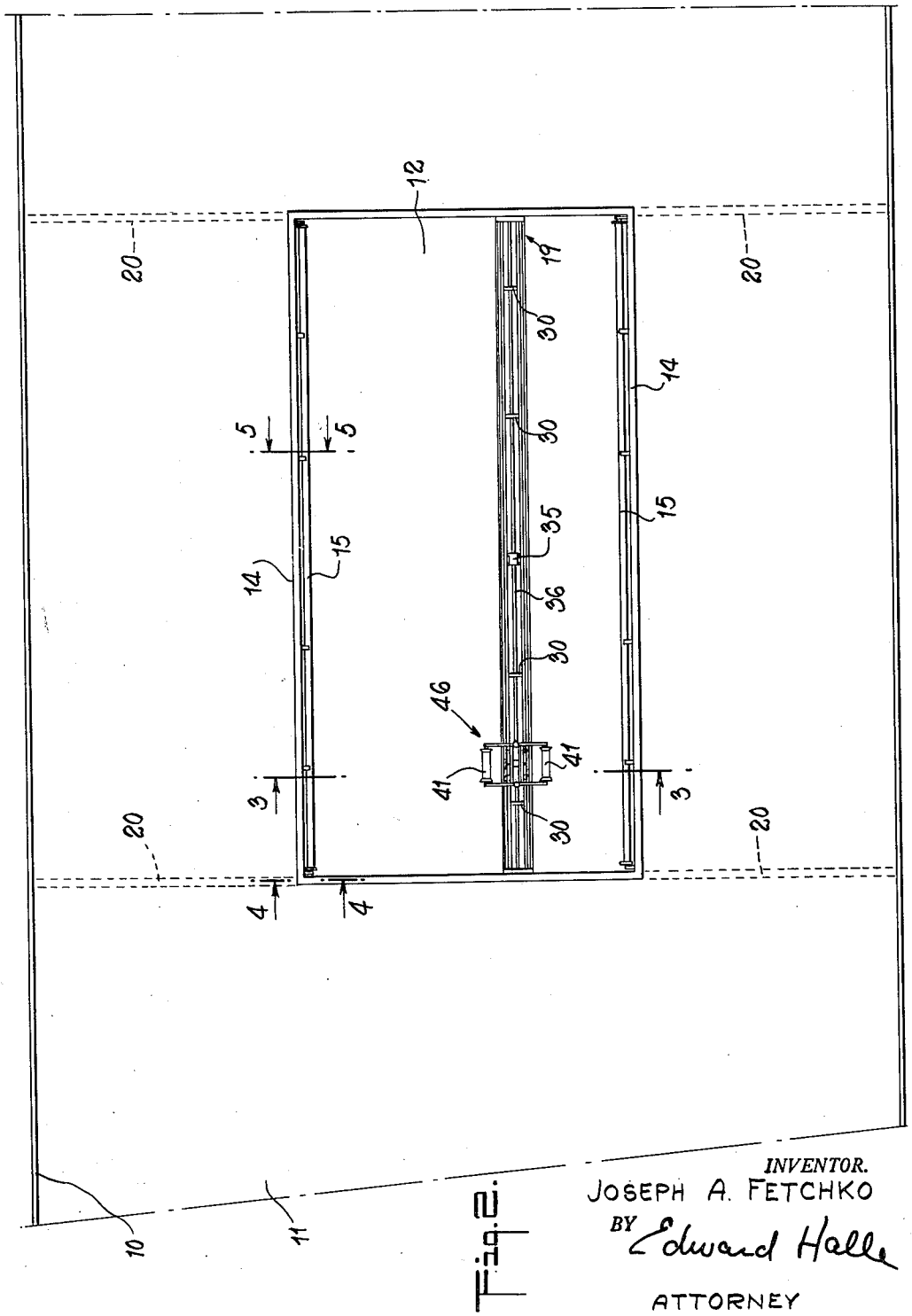
Fig. 2 shows portions of my device as they appear from above through the open hatch of a ship.

The primary carrying frame 19 should be of such length that it extends on both ends beyond the end bearings 16 of the longitudinal rollers 15 as shown in Fig. 2. The parallel overhead track beams 20 should be securely fixed in place and positioned by proper supports 20a, bolted or riveted to the deck 11, sufficiently below the longitudinal rollers 15, so that primary carrying frame 19, and all elements attached thereto, as described herein, will have sufficient clearance for the operation of the invention, as shown in Fig. 1.

The primary carrying frame 19 comprises longitudinal channel shaped members 22, which are welded or riveted to end members 23, which are joined to lower ends of housings 25, and pinion gear supports 26.

The longitudinal members 22 are so constructed on each side of the primary carrying frame 19, that the hollow portions of the channels face inwardly toward each other and are adapted to serve as tracks for the flanged wheels 52, of the secondary carrying frame 46, as described hereinbelow. A rack 37 is built onto or integral with the upper portion of one of the longitudinal members 22, as shown in Fig. 3 of the drawings, adapted to be engaged by the driving pinion 38, of the secondary carrying frame 46, as described hereinbelow.

The upper ends of the housings 25 have bearings 27, supporting axles 29, for the flanged wheels 21; and the upper ends of the pinion gear supports 26 accommodate the pinion drive shafts 28, so that the pinion 24, will properly engage in the racks. Where structurally necessary, undercarriage cross members 30 are supplied to reinforce the primary carrying frame 19, and support the shafts 36.

Power to move the primary carrying frame 19 is supplied in conventional manner by means of electric motor 35 driving shafts 36, which are connected to pinions 24 by means of sprockets 32 and 33, and a chain 34. The pinions 24 engage racks 31 bolted onto or integral with the overhead track beams 20.

By reason of this arrangement, when the motor 35 is operated, the primary carrying frame 19 is propelled along the overhead track beams 20. The chain 34 and sprockets 32 and 33 could be replaced with a series of reduction gears instead of the chain and sprocket system, as described, to accomplish the purpose intended.

The secondary carrying frame 46, made of steel or equivalent material, rides over the primary carrying frame 19 and moves reciprocally in a direction perpendicular to the direction of movement of the primary carrying frame 19. It comprise lateral frame members 47, cross frame members 48, supported on upright supports 49, which are, in turn, supported by bearings 50 and axles 51. The axles 51 have flanged wheels 52, which are adapted to fit (snugly) within the channels of the longitudinal members 22, which serve as a set of tracks for the secondary carrying frame 46. Power to move the secondary carrying frame 46 is supplied in conventional manner by means of an electric motor 39 driving the pinion 38 through a suitable reduction gear system 40.

By reason of this arrangement, when the motor 39 is operated, the secondary carrying frame 46 is propelled in either direction along the longitudinal members 22 of the primary carrying frame 19.

At each end of the secondary carrying frame 46 I have placed cylindrical spindles 41 with flanged ends 42, which revolve freely on axles 43, adapted to set into collars 44 positioned at the ends of the lateral frame members 47.

The details of electrical circuits or other power means and controls therefore are not a part of this invention. It is sufficient for an understanding of the invention that the motor or power means which moves the primary carrying frame 19, and the motor or power means which moves the secondary carrying frame 46, are controlled in any conventional manner by control devices situated on the deck concerned to enable the operator to move either frame as desired.

All of the component parts of the device are made of steel or equivalent material. It may be that for installations where lightness of weight is desirable, that certain well-known alloys of aluminum and other light-weight materials may be used for the construction of the device. The electrical system is, of course, made of materials commonly used in constructing such systems.

The device operates in the following manner: cargo is lowered through the square of the ship's hatch to the desired deck. The primary carrying frame 19 having been previously positioned at the side of the ship opposite to the area where it is desired to place the cargo, the secondary carrying frame 46 is then positioned so that the spindle 41 will engage the cargo runner 53 between the flanged ends 42 when the primary carrying frame 19 is propelled toward the cargo runner 53. The spindle 41 then engages the cargo runner 53 and moves it laterally, athwartship, in the direction that the primary carrying frame 19 is moving. The cargo runner 53 will then bend around the longitudinal cylinder 15 and at this juncture the cargo runner 53 is payed out at the same rate of speed (feet per minute) as the lateral movement of the primary carrying frame 19, so that the sling of cargo 54 will maintain a constant height above the deck during the athwartship movement as described. My invention is then in position as shown in the lower left-hand portion of Figure 1 of the drawings. When the sling of cargo 54 is directly over the desired portion of the deck the lateral movement of the primary carrying frame 19 is stopped. The cargo runner 53 continues to pay out and the sling of cargo 54 is lowered on to the desired portion of the deck 11. Cargo is discharged by reversing the above described procedure.

While a preferred form of the invention in all its respects has been described, there are equivalent constructions which may be employed without leaving the scope of the invention. For example, I have shown the overhead track beams 20 as I-beams. The flanged wheels 21 use the channel formed by one side of the I-beam for a track. An alternate construction would be to construct the overhead track beams 20 of I-beams and have the flanged wheels 21 ride over the I-beam and then either weld or bolt an angle beam on top of the I-beam to form a channel to keep the flanged wheels 21 on the track. In such a construction the racks 31 could be bolted or welded to the I-beam underneath the flanged wheels 21. This type of construction, although it probably would be more expensive than the preferred form would unquestionably be of greater strength. The same alternative arrangement could be made with respect to the longitudinal members 22 of the primary carrying frame 19. I do not, therefore, want to be limited to the exact details as set forth herein but wish to be protected for all constructions within the limitations of the claims following.

Wherefore, I claim:

1. In a cargo loading and discharge apparatus the combination of a cargo hoisting line adapted to bear a load, a hold with a hatch opening over the said hold, a primary carrying frame adapted to move back and forth underneath the said hatch opening having movably mounted thereon a secondary carrying frame adapted to move back and forth in a direction substantially perpendicular to that of the primary carrying frame, and at least one spindle on the mentioned secondary carrying frame; said hoisting line adapted to be lowered through the said hatch opening with a load suspended therefrom and said primary carrying frame, carrying the mentioned secondary carrying frame having the spindle, being movable from within the hatch opening to a position underneath the deck when the hoisting line as aforesaid is lowered to a position between the said primary carriage and an edge of the hatch opening so that the primary carriage moving out of the hatch opening will reeve the hoisting line about and underneath the hatch edge and over the spindle on the secondary carrying frame mounted on the primary carrying frame as the both frames move under the deck and the said load being continuously suspended from the mentioned hoisting line during the reeving operation until at its storage position.

2. The apparatus claimed in claim 1, having power means to move the primary and secondary carrying frames.

3. In a cargo loading and discharge apparatus the combination of at least one cargo hoisting line adapted to bear a load, at least one hold having a plurality of decks within it and a hatch opening over the said hold and a hatch opening at each deck level above the bottom deck of the hold; and beneath each deck of the hold, with the exception of the bottom deck of the hold, at least one primary carrying frame adapted to move back and forth underneath the said hatch opening of the deck, having movably mounted thereon a secondary carrying frame adapted to move back and forth in a direction substantially perpendicular to that of the primary carrying frame, and at least one spindle on the mentioned secondary carrying frame; said hoisting line adapted to be lowered through the hatch opening with a load suspended therefrom and said primary carrying frame, carrying the mentioned secondary carrying frame having the spindle, being movable from within the hatch opening to a position underneath the deck when the hoisting line as aforesaid is lowered to a position between the said primary carriage and an edge of the hatch opening so that the primary carriage moving out of the hatch opening will reeve the hoisting line about and underneath the hatch edge and over the spindle on the secondary carrying frame mounted on the primary carrying frame as the both frames move under the deck and the said load being continuously suspended from the mentioned hoisting line during the reeving operation until at its storage position.

4. The apparatus described in claim 3 having power means to move the primary carrying frame and the secondary carrying frame.

References Cited in the file of this patent

UNITED STATES PATENTS

| | | |
|---|---|---|
| 137,737 | Tillson | Apr. 8, 1873 |
| 821,243 | Hudgens | May 22, 1906 |
| 943,694 | Miller | Dec. 21, 1909 |
| 1,228,344 | Miller et al. | May 29, 1917 |
| 1,900,867 | Olds | Mar. 7, 1933 |
| 1,939,037 | Bogert | Dec. 12, 1933 |
| 2,490,610 | Anderson | Dec. 6, 1949 |
| 2,563,651 | Hurst | Aug. 7, 1951 |
| 2,669,363 | Kahlerth | Feb. 16, 1954 |